United States Patent
Mendiola

(10) Patent No.: US 8,078,677 B2
(45) Date of Patent: Dec. 13, 2011

(54) METHOD FOR MAKING RECOMMENDATIONS IN A SOCIAL NETWORKING SYSTEM BASED ON PERSONAL COMMUNICATION INFORMATION AND A SOCIAL NETWORKING SYSTEM INCORPORATING SAME

(75) Inventor: Anna Beltran Mendiola, New York, NY (US)

(73) Assignee: Voxp Pte. Ltd., Singapore (SG)

( * ) Notice: Subject to any disclaimer, the term of this patent is extended or adjusted under 35 U.S.C. 154(b) by 78 days.

(21) Appl. No.: 12/401,602

(22) Filed: Mar. 10, 2009

(65) Prior Publication Data
US 2009/0235335 A1    Sep. 17, 2009

Related U.S. Application Data

(60) Provisional application No. 61/068,969, filed on Mar. 11, 2008.

(51) Int. Cl.
| G06F 15/16 | (2006.01) |
| G06F 15/173 | (2006.01) |
| G06F 17/30 | (2006.01) |
| G06F 7/00 | (2006.01) |

(52) U.S. Cl. ............ 709/204; 709/218; 709/224; 726/4; 715/200; 715/206; 715/273; 715/745; 715/764; 707/999.102; 707/999.107; 707/781; 707/784

(58) Field of Classification Search .................. 709/204, 709/218, 224; 726/4; 715/200, 206, 273, 715/745, 764; 707/102, 104, 781, 784
See application file for complete search history.

(56) References Cited

U.S. PATENT DOCUMENTS

| 7,080,139 B1* | 7/2006 | Briggs et al. ............... 709/224 |
| 7,669,123 B2* | 2/2010 | Zuckerberg et al. ......... 715/273 |
| 7,672,953 B2* | 3/2010 | McAniff et al. ............ 707/770 |
| 7,725,492 B2* | 5/2010 | Sittig et al. ................. 707/784 |
| 7,730,216 B1* | 6/2010 | Issa et al. ................... 709/250 |
| RE41,450 E * | 7/2010 | Briggs et al. ............... 709/224 |
| 7,761,549 B2* | 7/2010 | Farnham et al. ............ 709/223 |
| 7,764,951 B2* | 7/2010 | Patel et al. ................. 455/414.1 |
| 7,797,256 B2* | 9/2010 | Zuckerberg et al. ......... 705/319 |
| 2005/0171799 A1* | 8/2005 | Hull et al. ................... 705/1 |
| 2006/0090067 A1* | 4/2006 | Edmonds et al. ............ 713/159 |
| 2007/0161382 A1* | 7/2007 | Melinger et al. ............ 455/456.1 |
| 2007/0192299 A1* | 8/2007 | Zuckerberg et al. ......... 707/3 |
| 2007/0230374 A1* | 10/2007 | Altberg et al. .............. 370/271 |
| 2007/0230671 A1* | 10/2007 | Altberg et al. ............. 379/93.01 |
| 2007/0230679 A1* | 10/2007 | Altberg et al. ............ 379/218.01 |
| 2007/0233736 A1* | 10/2007 | Xiong et al. ................ 707/104.1 |
| 2007/0242626 A1* | 10/2007 | Altberg et al. .............. 370/259 |
| 2007/0244969 A1* | 10/2007 | Knight et al. ............... 709/204 |
| 2007/0250922 A1* | 10/2007 | Horton et al. ............... 726/11 |
| 2008/0040474 A1* | 2/2008 | Zuckerberg et al. ......... 709/224 |

(Continued)

Primary Examiner — Khanh Dinh
Assistant Examiner — Saket K Daftuar
(74) Attorney, Agent, or Firm — Intellectual Property Law Group LLP

(57) ABSTRACT

A social networking system comprising a plurality of communication devices; a tracking system; and a social networking interface, where, when a first communication device from the plurality of communication devices communicates with the tracking system so as to authorize the tracking system to track communications made between the first communication device and other communication devices form the plurality of communication devices, and thereafter communicate prescribed details of the communications to the social networking interface, the social networking interface operable to generate a set of invite recommendations for the user associated with the first communication device based on the prescribed details.

16 Claims, 1 Drawing Sheet

U.S. PATENT DOCUMENTS

| | | | |
|---|---|---|---|
| 2008/0040673 A1* | 2/2008 | Zuckerberg et al. | 715/745 |
| 2008/0091723 A1* | 4/2008 | Zuckerberg et al. | 707/104.1 |
| 2008/0098087 A1* | 4/2008 | Lubeck | 709/218 |
| 2008/0132215 A1* | 6/2008 | Soderstrom et al. | 455/416 |
| 2008/0168099 A1* | 7/2008 | Skaf | 707/104.1 |
| 2009/0049127 A1* | 2/2009 | Juan et al. | 709/204 |
| 2009/0070684 A1* | 3/2009 | Aldrich et al. | 715/743 |
| 2009/0171964 A1* | 7/2009 | Eberstadt et al. | 707/9 |
| 2009/0172783 A1* | 7/2009 | Eberstadt | 726/4 |
| 2009/0210494 A1* | 8/2009 | Fisher et al. | 709/205 |
| 2009/0234910 A1* | 9/2009 | Chung et al. | 709/203 |
| 2009/0319288 A1* | 12/2009 | Slaney et al. | 705/1 |
| 2010/0076777 A1* | 3/2010 | Paretti et al. | 705/1 |
| 2010/0077484 A1* | 3/2010 | Paretti et al. | 726/26 |

* cited by examiner

METHOD FOR MAKING RECOMMENDATIONS IN A SOCIAL NETWORKING SYSTEM BASED ON PERSONAL COMMUNICATION INFORMATION AND A SOCIAL NETWORKING SYSTEM INCORPORATING SAME

CROSS-REFERENCE TO RELATED APPLICATION

This application claims benefit of priority to U.S. Provisional Application No. 61/068,969 filed on Mar. 11, 2008, the entire contents of which are herein incorporated by reference.

BACKGROUND OF THE INVENTION

1. Field of the Invention

The invention relates to a method for making recommendations in a social networking system based on personal communication information and a social networking system incorporating same. The method and system are particularly adapted to an environment where the personal communication information is obtained from a mobile communications device such as a mobile phone. It is in this context that the invention will be hereafter described.

2. Background

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Social networking systems, such as those operated by the websites Friendster (www.friendster.com), MySpace (www.myspace.com) and Facebook (www.facebook.com) are "pro-active" based systems. In this sense, a user of the system must identify and thereafter invite other users (typically friends or family) to join their social network. Inviting a user in this manner can be initiated in a direct way in situations where the other user's handle is already known. Alternatively, it can be initiated in an indirect way where the other user's handle is identified through a search. For example, a search of all those users who are members of the website who attended the same high school as the user searching. Once a friend's user handle is identified, an invite is forwarded to them.

Alternative systems, such as the commercial network system operated by LinkedIn (www.linkedin.com), offer the user the results of automated searches based on predetermined criteria. The user may then review these results to determine those other users who they wish to invite to become part of their social network. However, the fact that the predetermined criteria upon which recommendations are based are made without any real knowledge of a personal link between the user and the person suggested for an invite. To illustrate by example, the fact that two people worked at the same company or attended the same school does not necessarily mean that they know each other.

Furthermore, such queries are highly dependent on the ability of other users to provide accurate information in their profiles. The omission of relevant information or simple oversight on the part of a user in respect of the information upon which such searches are based can result in people within a user's social network who are also members of the social networking site not being identified in any automatic search.

Thus, the problem with these prior art systems is that the user must perform a significant level of work in either:

building up their social network by a series of separate invites; or reviewing search results proposed by the social network to determine whether an invite should be sent to such people.

It is therefore an object of the present invention to provide a system whereby automatic recommendations for inclusion in a person's social network are made based on real social contact information between the user and the person the subject of the recommendation.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the present invention there is a social networking system comprising:

a plurality of communication devices;

a tracking system; and a social networking interface, where, when a first communication device from the plurality of communication devices communicates with the tracking system so as to authorise the tracking system to track communications made between the first communication device and other communication devices form the plurality of communication devices, and thereafter communicate prescribed details of the communications to the social networking interface, the social networking interface operable to generate a set of invite recommendations for the user associated with the first communication device based on the prescribed details.

The prescribed details may include the handle of a person in possession of the communication device communicating with the first communication device or a unique public identifier of such communication device. Further, the prescribed details can also include at least one of the following:

the time of the communication;

the date of the communication;

the duration of the communication; and/or a recording of the communication, or an extract thereof.

The tracking system may be an application resident in the first communication device. In a further variation on this configuration, the tracking system is operable to provide prescribed information in respect of each contact in the first communication devices contact list to the social networking interface.

The first communication device can automatically communicate with the tracking system to authorise tracking of communications on initial configuration of the first communication device.

The tracking system may communicate prescribed details of the communications of the first communication device to the social networking interface on a real-time basis. The tracking system may further operate to exclude prescribed details of communications the first communication device makes or receives by way of a predefined shortcode. Alternatively, the tracking system may operate only to include prescribed details of communications the first communication device makes or receives by way of a predefined shortcode.

In a further alternative configuration of the invention, the tracking system operates to provide prescribed details of only those communications where the tracking system has been authorised by the first communication device and the other communication device to track their communications.

The communication with the tracking system to authorise tracking of communications may include a set of public unique identifiers of communication devices, the tracking system operable not to track communications sent or received from communication devices having a public unique identifier in the set of public unique identifiers.

The social networking interface can operate to authorise the sending of a recommended invitation on satisfaction of preset criteria.

The tracking system may process the communications to generate a set of unique prescribed details for communication to the social networking interface. Further, the tracking system may operate to keep a record of all prescribed details communicated to the social networking interface, the set of unique prescribed details being cross-referenced with this record and any matching elements omitted from the set.

The social networking interface may operate as a plug-in for a social networking application.

The communication device may be any one of the following: personal digital assistant, mobile phone, land-line phones, a computer.

In accordance with yet further aspects of the invention there are a method for making recommendations in a social networking system based on personal communication information, a tracking system for use in a social networking system, a social networking interface for use in a social networking system and a computer program executable to perform the method for making recommendations in a social networking system based on personal communication information.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

Figure 1:
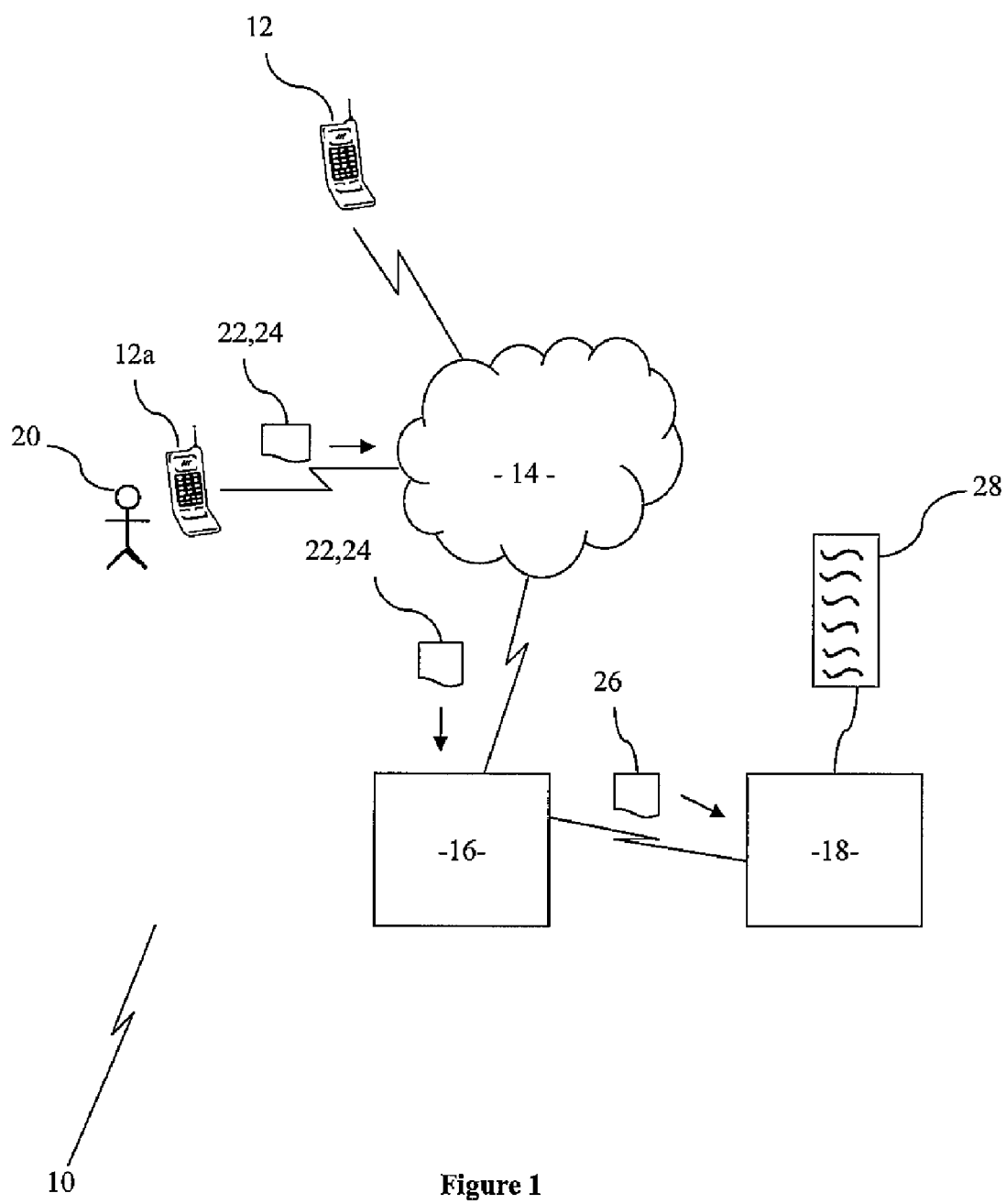
FIG. 1 is a schematic of a first embodiment of the invention.

In accordance with a first embodiment of the invention there is a social networking system 10 comprising:

a plurality of mobile phones 12, each mobile phone 12 adapted to communicate through a telecommunications network 14.

a tracking system 16; and a social networking interface 18.

The possessor of at least one of the plurality of mobile phones 12 has given authority to the tracking system 16 to track their mobile phone communications. Such mobile phone 12 will hereafter be referred to as "tracked mobile phones".

The tracking system 16 is also connected to the telecommunications network 14. This connection allows the tracking system to track details of all communications made to and by the tracked mobile phones 12. In this embodiment, with respect to short messaging system ("SMS") messages, the connection between tracking system 16 and telecommunications network 14 is by way of the telecommunications network's 14 Signalling System #7 ("SS7") links.

This embodiment will now be described in the context of its intended use.

The possessor 20 of one of the plurality of mobile phones 12a sends a SMS message 22 to the tracking system 16. SMS message 22 has as its message body the word "ON". On receipt of the SMS message 22, the tracking system 16 parses the message body to determine the content of the message. Noting that in this case the message body has the keyword "ON" contained therein, the tracking system 16 operates to initiate recording of communications by and to the mobile phone 12a that sent SMS message 22.

At the same time as this takes place, the tracking system 16 sends a communication message to mobile phone 12a request further registration information from the possessor 20. This additional registration information includes such details as the handle by which the possessor 20 is known by with the social networking interface 18.

This information may be provided to the tracking system 16 by the possessor 20 in a variety of ways. In this embodiment, the possessor 20 provides the information by way of a further SMS message 24.

On receipt of the further SMS message 24, the tracking system 16 thereafter operates to associate all communications made from and to mobile phone 12a with the handle as provided by the possessor 20 of the mobile phone 12a. Such associated communication information is accumulated for a predetermined period of time. At the end of the predetermined period of time, the accumulated communication information is uploaded as a file transfer 26 to the social networking interface 18. The accumulated communication information, as stored by the tracking system 16, is then deleted to ease memory and possible network congestion issues.

As alluded to above, the social networking interface 18 receives file transfers 26 in respect of varying handles of users of the social networking interface 18. Upon receipt of each file transfer 26, the social networking interface 18 identifies the handle to which the accumulated communication records relate. Thereafter, the communication records are parsed to identify each unique number with whom the user has communicated within the predetermined period to form a contact list 28.

In developing a list of recommended invites, the social networking interface 18 cross-references each unique phone number included in the contact list 28 with the phone numbers recorded for each other user. Where a match is found between a unique phone number on the contact list and other users of the social networking interface 18, a flag associated with the handle is raised indicating that the user should be presented with new recommendations when they next log on. At the same time, a recommendations table is generated and associated with the flag.

When the user next logs on to the social networking interface 18, the social networking interface checks to see if a flag has been raised associated with their handle. If a flag has been raised, the social networking interface then presents the handles of each entry in the recommendations table to the user in turn, querying whether the user wishes to invite each such person to become part of their social network.

In accordance with a second embodiment of the present invention, where like numerals reference like parts, there is a social networking system. Social networking system operates in the same manner as social networking system 10 as described in the first embodiment of the invention with the exception of the following processing.

When a user first registers with the social networking interface 18, the user is requested to connect their mobile phone to the processing unit through which they are accessing the social networking interface 18. Upon connection of the mobile phone to the processing unit, the processing unit is instructed by the social networking interface to upload to it all the details included in the mobile phone's address book.

It should be appreciated by the person skilled in the art that the above invention is not limited to the embodiment described. In particular, the following modifications and improvements may be made without departing from the scope of the present invention:

Ideally information in respect of each communication between a tracked mobile phone 12 and any other telecommunications device is identified by way of Call Detail Records ("CDRs") and message logs.

In respect of voice calls, the data captured by the tracking system 16 in respect of the communication, in addition to details of the called or calling party, may include:
the time and date of call;
the duration of the call; and
an audio recording of all or part of the call.
Similarly, in respect of message-based communications, such as SMS messages, in addition to details of the messaged or messaging party, information also obtained about the communication by the tracking system 16 may include:
the time and date of the message; and
the full message, or an extract thereof.

Rather than having an external entity track the communications made to, and made by, a mobile phone, the mobile phone may have an application stored thereon which, when executed, stores details of each communication made to and by the mobile phone. In such a configuration, there is no need for links to the SS7 lines.

The connection between tracking system 16 and telecommunications network 14 need not be by way of the telecommunications network's 14 SS7 links. Rather, the connection may be by any similar set of telephony signalling protocols used for setting up phone calls, transmitting text messages and other services.

The method by which tracking of the communications to and from a mobile phone are initialised may vary from that described above. For instance, tracking may be initialised through accessing the social networking interface 18 or another internet website. As a further alternative, tracking may be initialised through a written request to the legal entity that operates the tracking system 16.

As a further alternative, the purchase of a particular phone may automatically initiate tracking of all communications made by and to that phone. This arrangement is particularly suited to situations where the social networking interface 18 co-brands a phone with a manufacturer.

Registration information may be provided by methods other than SMS. The same information may be provided by way of the social networking interface 18 or another website. Other alternative methods of providing such information include by voice contact with an operator or voice messaging system or by written communication, such as letters or e-mails.

The systems as described above may be adapted such that the information in respect of all communications made to and from a mobile phone may be provided to multiple social networking interfaces 18. In this situation, the communications will need to be able to provide either all handles used by the person in possession of the mobile phone or the specific handle used in respect of the particular social networking interface 18 to which the communication information is being provided.

For practical reasons, batch upload of the communication records associated with a mobile phone should be made on a once or twice a day basis. However, there is nothing preventing the system from being able to operate on a real-time basis.

In place of uploading a full set of communication records to the social networking interface 18, the tracking system 16 may pre-process the information to create a list of unique phone numbers with whom communication has been made.

In a further modification to the variation described in the previous point, the list created by the tracking system 16 may be a list of unique handles with whom communication has been made rather than unique phone numbers. It should be appreciated that in order to do this, the social networking interface 18 will need to communicate related handle and phone information to the tracking system 16 so that an appropriate cross-reference can be made in generating the list.

In yet a further variation on either modification suggested in the last two points, the tracking system 16 may keep a record of all unique phone numbers/handles with whom the phone has communicated and exclude any such phone numbers/handles from any future uploads. In this manner, the owner of the phone is not continuously requested by the social networking interface 18 to invite a person whom they have previously declined to invite by reason of simply having been in communication with them again.

The systems may be modified such that invitations are issued automatically, and without seeking confirmation from the owner of the phone, on the owner communicating with a person more than a predetermined number of times within a predefined time interval.

The systems may further be modified such that tracking of a communication only occurs when the communication is sent via a shortcode associated with the tracking system 18. In an opposing variant of this modification, the systems may also be modified such that a communication is not tracked when the communication is sent via a shortcode associated with the tracking system 18.

The social networking interface 18 may display call and text data as part of its user interface. Such data may be searchable or able to be viewed in different manners (for instance, details of the most recent calls received, details of the most recent calls made, details of the most frequent calls received, details of the most frequent calls made, etc.).

Communications may be tracked only in situations where both the sender and the receiver of the communication have agreed to tracking of their communications. In this situation, the tracking system 18 is required to keep a record of all parties who have agreed to have their communications tracked so that the sender and receiver can be cross-references against such records prior to tracking the communication.

The social networking interface 18 may be adapted to allow for calls and/or text messages to members of a user's social network to be initiated from the user interface.

The systems may be adapted such that details of communications are not achieved by probing methods such as direct SS7 links. For instance, the information may be obtained from the telecommunications provider itself (i.e. through their existing billing systems). This has benefits to both parties as it decreases system costs for the operator of the social network systems and reduces system load for the telecommunications provider.

The social network systems may operate as a plug-in to existing social networking sites such as those mentioned in the "Background to the Invention" section above.

The system as described in the second embodiment of the invention may also operate in reverse. In this situation, the social networking interface 18 also acts as a "backup" system for the contact information otherwise stored in the phone. Accordingly, on loss of such contact information, or the phone itself, the user of the social networking interface 18 may simply download the contact information stored as part of their social network to restore their contacts.

The system may be modified to be used with mobile phones, personal digital assistants, home phones, e-mails, and any other communication device or other form of communication as would be apparent to the person skilled in the art.

To ensure that certain communications are kept secret, the possessor 40 of the mobile phone 12 may, upon registering the mobile phone 12 with the tracking system 16 by way of SMS message 22, suffix to the SMS message 22 a list of phone numbers for which communications should not be tracked. Thus, sending a SMS message 22 with the body message of "ON 12345" means that all communication messages to and from the mobile phone 12 are to be tracked except those to and from the mobile phone having 12345 as its public unique identifier.

The system may be adapted such that SIM cards may be hosted by the operator and communications made to the public unique identifier associated with the SIM card are captured. The SIM card may be hosted by the operator in GSM modems hooked up to the operator's system or similar configuration. Such systems allow for reduced operator costs while also providing explicit authority to track communications.

It should be further appreciated by the person skilled in the art that the modifications, additions and variations described above, where not mutually exclusive, can be combined to form yet further embodiments within the scope of the present invention. The scope of the present invention, for the purpose of the present patent document, is not limited merely to the specific example embodiments or alternatives of the foregoing description.

I claim:

1. A social networking system comprising:
a plurality of communication devices; a tracking system; and a social networking interface,
where, when a first communication device from the plurality of communication devices: associated with a user, communicates a message with the tracking system so as to authorize the tracking system to track communications made between the first communication device and other communication devices from the plurality of communication devices,
the tracking system parses the message as communicated by the first communication device and sends a communication message back to the first communication device requesting registration information of the user, and thereafter accumulating and storing the tracked communications for a predetermined period of time,
the tracking system communicates as a file transfer prescribed details of the communications to the social networking interface, the details inclusive of the registration information of the user,
the social networking interface operable to generate a set of invite recommendations for the user associated with the first communication device based on the prescribed details,
wherein the invite recommendations result from parsing the prescribed details in the file, to identify each unique number or handle with whom the user had communicated within the predetermined period of time,
forming a contact list of these unique numbers and handles with whom the user had communicated,
cross referencing the contact list against a plurality of phone numbers or handles previously recorded with the social networking interface from each of a plurality of other users of the social networking interface,
determining a match between the details on the contact list of the user with a phone number or handle belonging to one or more of the other users, and
recommending the match to the user by presenting the user an invitation to connect to the matched one or more other users.

2. A social networking system according to claim 1, where the prescribed details include the handle of a person in possession of the communication device communicating with the first communication device or a unique public identifier of such communication device.

3. A social networking system according to claim 1 or claim 2, where the prescribed details further include at least one of the following:
the time of the communication;
the date of the communication;
the duration of the communication; and/or
a recording of the communication, or an extract thereof.

4. A social networking system according to claim 1 or 2, where the tracking system is an application resident in the first communication device.

5. A social networking system according to claim 1 or claim 2, where the tracking system is operable to provide prescribed information in respect of each contact in the first communication device's contact list to the social networking interface.

6. A social networking system according to claim 1 or 2, where the first communication device automatically communicates with the tracking system to authorise tracking of communications on initial configuration of the first communication device.

7. A social networking system according to claim 1 or 2, where the tracking system communicates prescribed details of the communications of the first communication device to the social networking interface on a real-time basis.

8. A social networking system according to claim 1 or 2, where the tracking system operates to exclude prescribed details of communications the first communication device makes or receives by way of a predefined shortcode.

9. A social networking system according to claim 1 or 2, where the tracking system operates only to include prescribed details of communications the first communication device makes or receives by way of a predefined shortcode.

10. A social networking system according to claim 1 or 2, where the tracking system operates to provide prescribed details of only those communications where the tracking system has been authorised by the first communication device and the other communication device to track their communications.

11. A social networking system according to claim 1 or 2, where the communication with the tracking system to authorise tracking of communications includes a set of public unique identifiers of communication devices, the tracking system operable not to track communications sent or received from communication devices having a public unique identifier in the set of public unique identifiers.

12. A social networking system according to claim 1 or 2, where the social networking interface operates to authorise the sending of a recommended invitation on satisfaction of preset criteria.

13. A social networking system according to claim 1 or 2, where the tracking system processes the communications to generate a set of unique prescribed details for communication to the social networking interface.

14. A social networking system according to claim 1 or claim 2, where the tracking system operates to keep a record of all prescribed details communicated to the social networking interface, the set of unique prescribed detail being cross-referenced with this record and any matching elements omitted from the set.

15. A social networking system according to claim 1 or 2, where the social networking interface is a plug-in for a social networking application.

16. A social networking system according to claim 1 or 2, where the communication device may be any one of the following: personal digital assistant, mobile phone, land-line phones, a computer.

* * * * *